… … …

United States Patent
Imamura et al.

(10) Patent No.: US 8,155,190 B2
(45) Date of Patent: Apr. 10, 2012

(54) CODING APPARTUS, CODING METHOD, PROGRAM FOR CODING METHOD, AND RECORDING MEDIUM RECORDING CODING METHOD

(75) Inventors: Akihiro Imamura, Tokyo (JP); Tatsuo Fujiwara, Tokyo (JP); Takefumi Nagumo, Kanagawa (JP); Makoto Daido, Tokyo (JP)

(73) Assignee: Sony Corporation, Tokyo (JP)

( * ) Notice: Subject to any disclaimer, the term of this patent is extended or adjusted under 35 U.S.C. 154(b) by 1034 days.

(21) Appl. No.: 12/101,464

(22) Filed: Apr. 11, 2008

(65) Prior Publication Data

US 2008/0253454 A1 Oct. 16, 2008

(30) Foreign Application Priority Data

Apr. 13, 2007 (JP) ................ P2007-106220

(51) Int. Cl.
H04N 11/02 (2006.01)
(52) U.S. Cl. ............... 375/240.13; 375/240; 375/240.26
(58) Field of Classification Search .................. 375/240, 375/240.13, 240.26
See application file for complete search history.

(56) References Cited

U.S. PATENT DOCUMENTS

| | | | |
|---|---|---|---|
| 7,590,296 B2 * | 9/2009 | Kobayashi | 382/238 |
| 7,940,843 B1 * | 5/2011 | Nie et al. | 375/240.02 |
| 2005/0244063 A1 * | 11/2005 | Kwon et al. | 382/233 |
| 2006/0051068 A1 * | 3/2006 | Gomila | 386/114 |
| 2006/0126962 A1 * | 6/2006 | Sun | 382/268 |
| 2006/0146941 A1 * | 7/2006 | Cha et al. | 375/240.29 |
| 2006/0147123 A1 | 7/2006 | Kajihata | |
| 2007/0025448 A1 * | 2/2007 | Cha et al. | 375/240.24 |

FOREIGN PATENT DOCUMENTS

| | | |
|---|---|---|
| JP | 08-084342 | 3/1996 |
| JP | 10-070717 | 3/1998 |
| JP | 11-046362 | 2/1999 |
| JP | 2006-174138 | 6/2006 |
| JP | 2006-303734 | 11/2006 |
| JP | 2007-19994 | 1/2007 |

* cited by examiner

Primary Examiner — Kwang B Yao
Assistant Examiner — Nguyen Ngo
(74) Attorney, Agent, or Firm — Finnegan, Henderson, Farabow, Garrett & Dunner, L.L.P.

(57) ABSTRACT

A coding apparatus includes: an intra-coding complexity detecting section that detects an intra-coding complexity indicating a complexity of an intra-coding process; an inter-coding complexity detecting section that detects an inter-coding complexity indicating a complexity of an inter-coding process; a characteristic curve calculating section that calculates a characteristic curve indicating a value of strength data indicating the strength of a deblocking filter with a data amount per unit time of coded data as a variable, on the basis of the intra-coding complexity and the inter-coding complexity; and a strength value calculating section that calculates a value of the strength data by substituting a data amount of the coded data into the characteristic curve.

9 Claims, 5 Drawing Sheets

FIG. 7 ers α and β. In the initial setting, the parameters α and β are
CODING APPARTUS, CODING METHOD, PROGRAM FOR CODING METHOD, AND RECORDING MEDIUM RECORDING CODING METHOD

CROSS REFERENCES TO RELATED APPLICATIONS

The present invention contains subject matter related to Japanese Patent Application JP 2007-106220 filed in the Japanese Patent Office on Apr. 13, 2007, the entire contents of which are incorporated herein by reference.

BACKGROUND OF THE INVENTION

1. Field of the Invention

The present invention relates to a coding apparatus, a coding method, a program for a coding method, and a recording medium recording a program for a coding method. The present invention is applicable to, for example, a coding apparatus conforming to the ITU (International Telecommunication Union)-T Recommendation H. 264 (hereinafter, simply referred to as H. 264). According to the present invention, a characteristic curve indicating the strength of a deblocking filter is calculated from the complexity of intra-coding and the complexity of inter-coding with the data amount per unit time taken as a variable, and the strength of the deblocking filter is calculated from this characteristic curve, thereby setting the strength of the deblocking filter automatically and appropriately.

2. Description of the Related Art

In the related art, a coding apparatus conforming to H. 264 suppresses block noise by a deblocking filter. In this regard, H. 264 defines the strength of a deblocking filter by parameters α and β. In the initial setting, the parameters α and β are set in accordance with quantization parameters. In H. 264, the On/Off of processing by a deblocking filter is set in the slice header of a bit stream that is subjected to a coding process and outputted, and the strength of the deblocking filter is set on the basis of an offset value from the initial setting value.

In the related art, in the case of a coding apparatus conforming to H. 264, a decoded image is visually observed by the operator to adjust the offset value to be set in the bit stream, thereby adjusting the strength of the deblocking filter.

A contrivance related to the above processing of the deblocking filter is proposed in Japanese Unexamined Patent Application Publication No. 2006-174138. Further, a configuration for dynamically switching a GOP structure on the basis of parameters extracted from video data is disclosed in Japanese Unexamined Patent Application Publication No. 2007-19994.

In this connection, it would be convenient if the strength of a deblocking filter can be set automatically and appropriately.

SUMMARY OF THE INVENTION

It is thus desirable to provide a coding apparatus, a coding method, a program for a coding method, and a recording medium recording a program for a coding method.

According to an embodiment of the present invention, there is provided a coding apparatus for applying a coding process to video data on a block-by-block basis while switching between an intra-coding process and an inter-coding process to generate coded data, and outputting the coded data together with strength data indicating a strength of a deblocking filter, including: an intra-coding complexity detecting section that detects an intra-coding complexity indicating a complexity of the intra-coding process; an inter-coding complexity detecting section that detects an inter-coding complexity indicating a complexity of the inter-coding process; a characteristic curve calculating section that calculates a characteristic curve indicating a value of the strength data with a data amount per unit time of the coded data as a variable, on the basis of the intra-coding complexity and the inter-coding complexity; and a strength value calculating section that calculates a value of the strength data by substituting a data amount of the coded data into the characteristic curve.

According to an embodiment of the present invention, there is provided a coding method for applying a coding process to video data on a block-by-block basis while switching between an intra-coding process and an inter-coding process to generate coded data, and outputting the coded data together with strength data indicating a strength of a deblocking filter, including the steps of: detecting an intra-coding complexity indicating a complexity of the intra-coding process; detecting an inter-coding complexity indicating a complexity of the inter-coding process; calculating a characteristic curve indicating a value of the strength data with a data amount per unit time of the coded data as a variable, on the basis of the intra-coding complexity and the inter-coding complexity; and calculating a value of the strength data by substituting a data amount of the coded data into the characteristic curve.

According to an embodiment of the present invention, there is provided a program for a coding method for applying a coding process to video data on a block-by-block basis while switching between an intra-coding process and an inter-coding process to generate coded data, and outputting the coded data together with strength data indicating a strength of a deblocking filter, including the steps of: detecting an intra-coding complexity indicating a complexity of the intra-coding process; detecting an inter-coding complexity indicating a complexity of the inter-coding process; calculating a characteristic curve indicating a value of the strength data with a data amount per unit time of the coded data as a variable, on the basis of the intra-coding complexity and the inter-coding complexity; and calculating a value of the strength data by substituting a data amount of the coded data into the characteristic curve.

According to an embodiment of the present invention, there is provided a recording medium which records a program for a coding method for applying a coding process to video data on a block-by-block basis while switching between an intra-coding process and an inter-coding process to generate coded data, and outputting the coded data together with strength data indicating a strength of a deblocking filter, the program including the steps of: detecting an intra-coding complexity indicating a complexity of the intra-coding process; detecting an inter-coding complexity indicating a complexity of the inter-coding process; calculating a characteristic curve indicating a value of the strength data with a data amount per unit time of the coded data as a variable, on the basis of the intra-coding complexity and the inter-coding complexity; and calculating a value of the strength data by substituting a data amount of the coded data into the characteristic curve.

The optimal value of the strength of the deblocking filter according to the configuration of each of the above-described embodiments can be represented by a characteristic curve that takes the data amount of coded data per unit time as a variable, and this characteristic curve can be determined by the intra-coding complexity and the inter-coding complexity. Therefore, according to the configuration of each of the above-described embodiments, the strength of a deblocking filter can be set automatically and appropriately.

According to the present invention, the strength of a deblocking filter can be set automatically and appropriately.

DESCRIPTION OF THE PREFERRED EMBODIMENTS

Hereinbelow, embodiments of the present invention will be described while referring to the drawings as appropriate.

Embodiment 1

(1) Configuration of Embodiment

Figure 1:
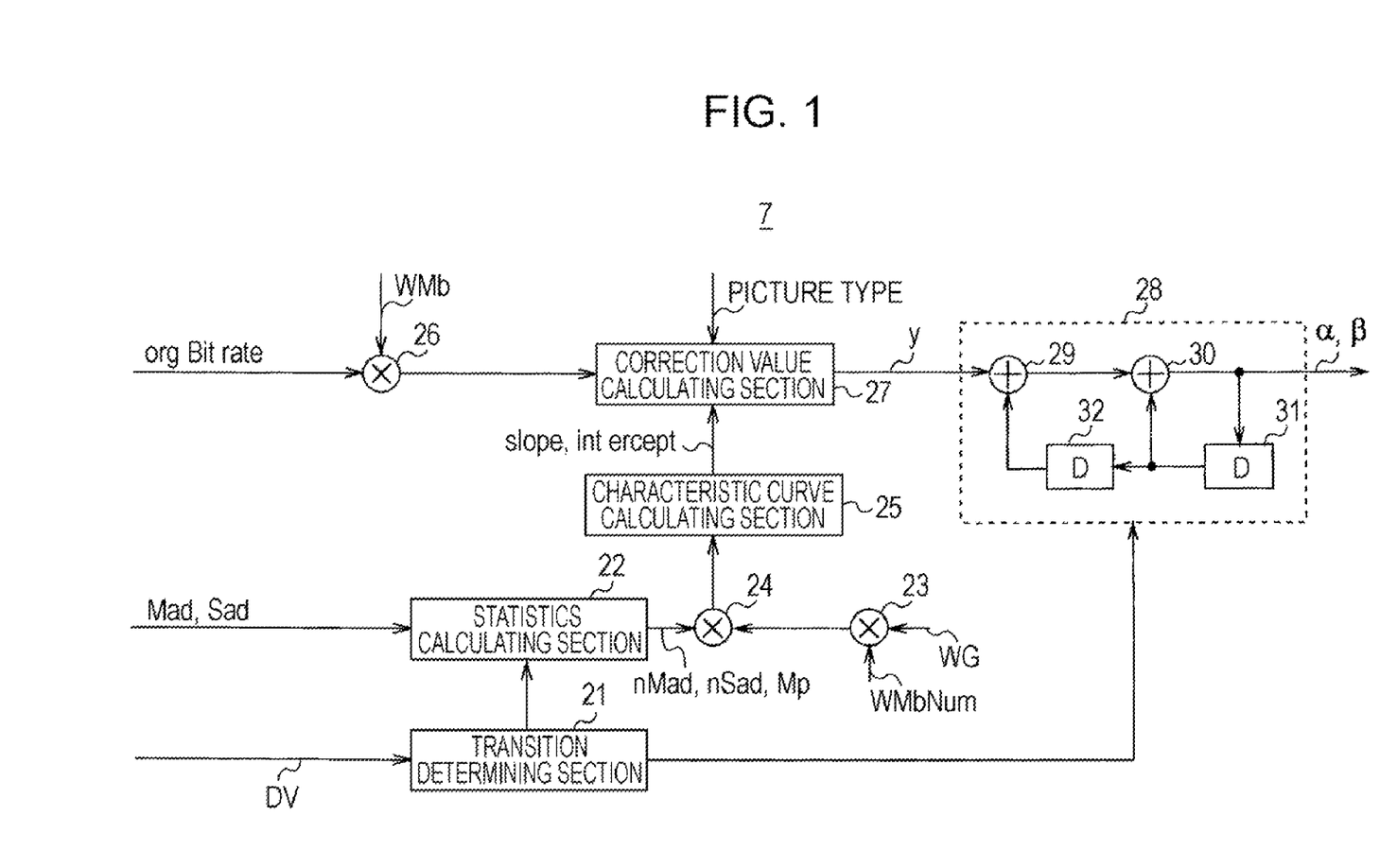
FIG. 1 is a block diagram showing the configuration of a parameter processing section in an encoder according to Embodiment 1 of the present invention.
Figure 2:
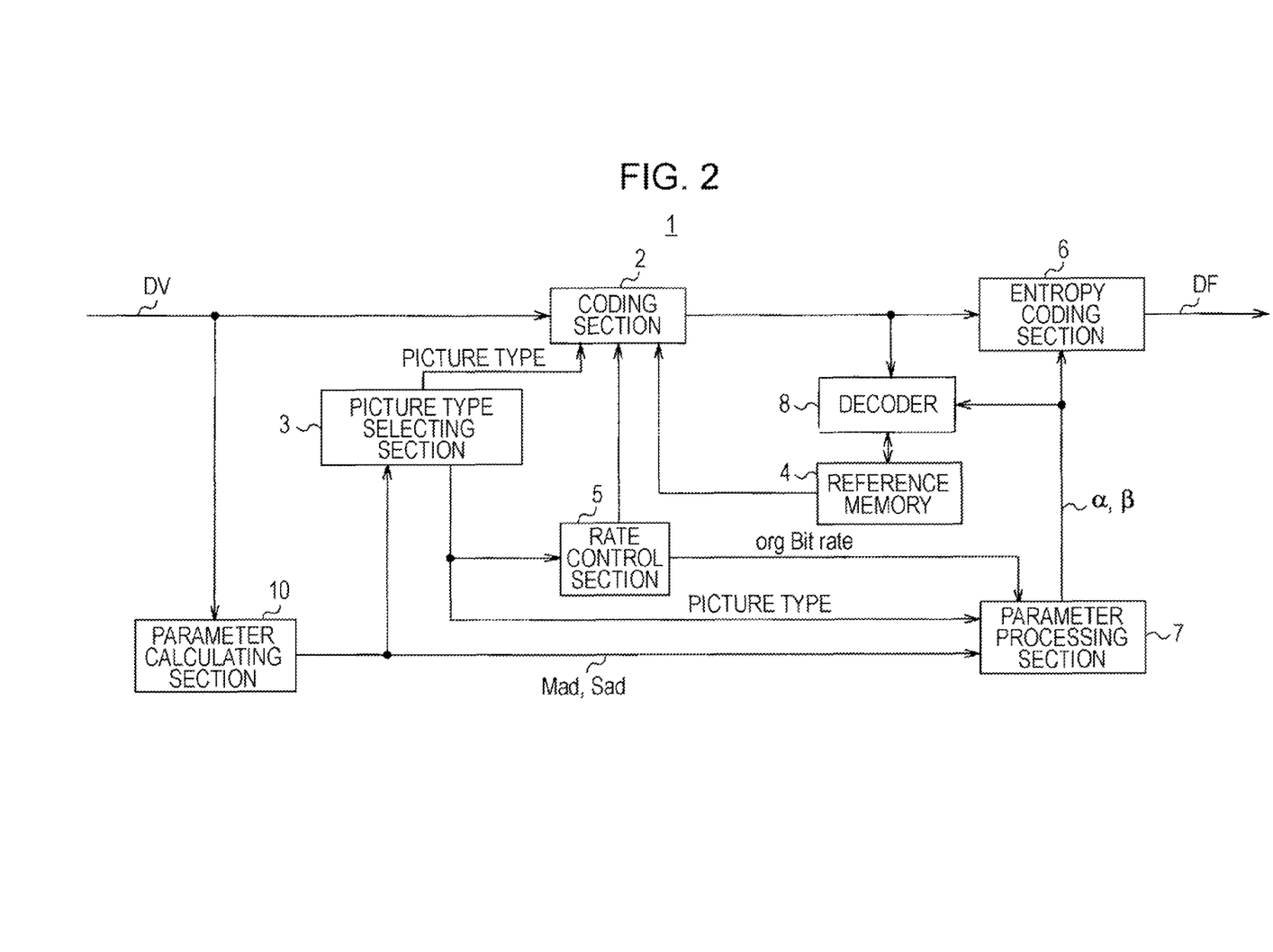
FIG. 2 is a block diagram showing the encoder according to Embodiment 1 of the present invention.

FIG. 2 is a block diagram showing a video data encoder 1 applied to an authoring system according to Embodiment 1 of the present invention. FIG. 1 is a block diagram showing the configuration of a parameter processing section 7 of the encoder 1 in detail.

The authoring system according to this embodiment records and retains audio data or video data to be edited on a recording medium such as a hard disk device, and accepts such setting as an edit point, Effects, encoding conditions, and the like made through operation of the operator. After editing the video data or audio data recorded on the recording medium in accordance with the accepted conditions and recording the resulting data, the authoring system encodes video data DV by the encoder 1, generating coded data DF of the video data coded in H. 264. Likewise, this authoring system applies a coding process to audio data to generate coded data of the audio data, and subjects these coded data of the video data and audio data to time division multiplexing to generate a program stream to be recorded onto, for example, an optical disc.

The encoder 1 is formed by a processor for processing the video data DV by executing a predetermined program. In this embodiment, this program is provided by being installed in advance. Alternatively, the program may be provided by being recorded on a recording medium such as an optical disc, a magnetic disc, or a memory card, or may be provided by being downloaded via a network such as the Internet.

In the encoder 1, in accordance with a GOP structure dynamically determined in accordance with the video data DV in a picture type selecting section 3, the coding section 2 calculates a cost function from the video data DV that is sequentially inputted, and detects an optimal mode. Further, after intra-prediction or inter-prediction is performed on the video data DV on a macroblock-by-macroblock basis in accordance with the detected optimal mode, an orthogonal transform process is performed, and the resulting factor data is subjected to a quantization process by rate control of a rate control section 5 before being outputted.

An entropy coding section 6 applies an entropy coding process to the output data from the coding section 2, outputting a bit stream of the coded data DF of video data. At this time, the entropy coding section 6 sets a prediction mode, a quantization scale in the coding section 2, strength data $\alpha$, $\beta$ indicating the strength of a deblocking filter obtained by a parameter processing section 7, and the like in the bit stream for output.

Contrary to the coding section 2, a decoder 8 performs an inverse quantization process on the output data of the coding section 2 and then performs an inverse orthogonal transform process. Further, as required, the decoder 8 performs an addition process with a reference frame stored in a reference memory 4, thereby decoding the original video data DV.

The reference memory 4 stores and retains the video data DV decoded by the decoder 8 as a reference frame, and outputs the reference frame to the coding section 2 in accordance with processing of the coding section 2.

A parameter calculating section 10 calculates from the sequentially inputted video data DV a parameter Mad (mean absolute difference) indicating the complexity of an intra-coding process, and a parameter Sad (sum of absolute difference) indicating the complexity of an inter-coding process. In this embodiment, the parameter calculating section 10 subtracts the mean (average) of pixel values in each macroblock from the pixel values in the macroblock, takes the absolute values of the subtracted values and sums the absolute values for each individual macroblock, thereby calculating the variance of pixel values for each individual macroblock. The parameter calculating section 10 sums up the variance of pixel values for each individual macroblock on a picture-by-picture basis, thereby calculating the parameter Mad indicating the complexity of an intra-coding process.

Further, the parameter calculating section 10 takes the absolute values of differences from corresponding pixel values in the immediately preceding picture and sums the absolute values for each individual macroblock, thereby calculating the complexity of an inter-coding process for each individual macroblock. The parameter calculating section 10 sums up the complexity of an inter-coding process for each individual macroblock on a picture-by-picture basis, thus calculating the parameter Sad indicating the complexity of an inter-coding process.

Figure 3:
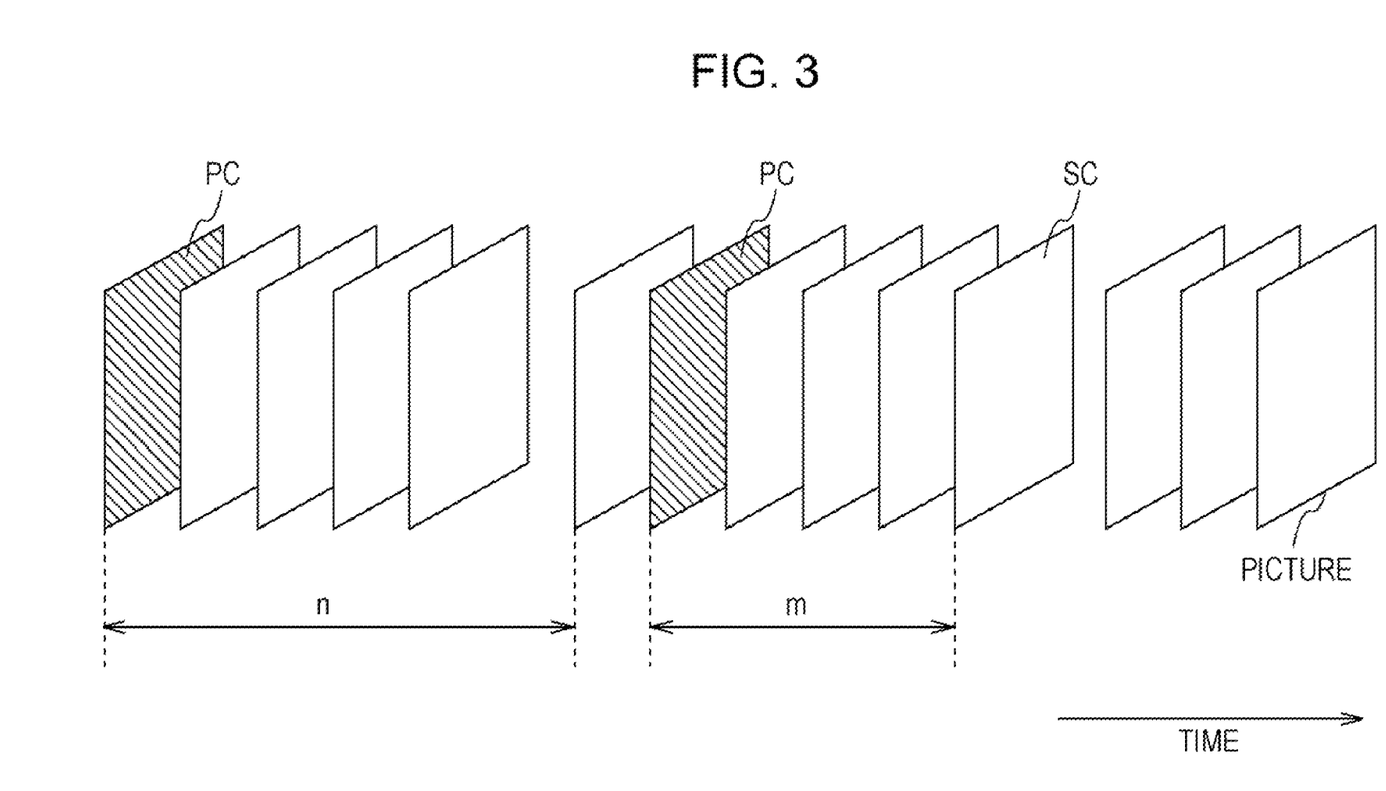
FIG. 3 is a schematic diagram used for illustrating the processing of parameters by the encoder shown in FIG. 1.

As shown in FIG. 3 and the equation below, the picture type selecting section 3 averages the parameter Mad indicating the complexity of an intra-coding process, which is calculated by the parameter calculating section 10, by dividing the parameter Mad by the number of macroblocks in one picture on a macroblock-by-macroblock basis, and then averages the resulting value over a predetermined number n of pictures, thus calculating the averaged parameter nMad. In this embodiment, as shown in FIG. 3, the predetermined number n of pictures include a current picture PC that is the picture to be processed, and pictures succeeding this current picture.

[Equation 1]

$$nMad = \frac{1}{n} \sum Mad / MbNum \qquad (1)$$

Here, NbNum denotes the number of macroblocks in one picture, and the range of $\Sigma$ is n. In the predetermined number of pictures, when a scene change is detected in the video data DV, the picture type selecting section 3 interrupts the calculation of the parameter nMad, and performs a sample-and-hold operation on the parameter nMad. Therefore, the parameter nMad calculated in the immediately preceding n pictures is applied to n−1 pictures immediately preceding a picture in which a scene change is detected.

Further, as indicated by the equation below, the picture type selecting section 3 similarly divides the parameter Sad indicating the complexity of an inter-coding process, which is calculated by the parameter calculating section 10, by the number of macroblocks in one picture for averaging, thus calculating the averaged parameter nSad.

[Equation 2]

$$nSad = \frac{1}{n}\sum Sad/MbNum \qquad (2)$$

In this case as well, when a scene change is detected within the n pictures to be averaged, a sample-and-hold operation is performed on the parameter nSad related to intra-coding. Also, as indicated by the equation below, the picture type selecting section 3 divides the parameter nsad related to intra-coding by the parameter nMad related to intra-coding, thus calculating a parameter Mp (motion parameter) indicating the intensity of motion with reference to the parameter nMad related to intra-coding.

[Equation 3]

$$Mp = nSad/nMad \qquad (3)$$

The picture type selecting section 3 sets an I picture in the video data DV for each predetermined picture. As for the remaining pictures, the parameter Mp is evaluated against a predetermined threshold, and if the parameter Mp is equal to or smaller than this threshold, the corresponding pictures are set as P-pictures. If the parameter Mp is larger than this threshold, the corresponding pictures are alternately set as P- and B-pictures. The picture type selecting section 3 thus dynamically sets a GOP structure in accordance with the video data DV.

The rate control section 5 controls the amount of generated bits by switching the quantization scale of the coding section 2 in accordance with the amount of output data of the entropy coding section 6 by the technique of, for example, TM5.

The parameter processing section 7 obtains the strength data α, β of a deblocking filter by processing the parameters Mad, Sad obtained by the parameter calculating section 10.

That is, in the parameter processing section 7 (FIG. 1), a transition determining section 21 detects a scene change picture or a picture in which an image changes at high speed. Here, the picture in which an image changes at high speed refers to, for example, a picture in a transition period due to fade-in, fade-out, dissolve, or the like, or a picture in which pan or wipe operation is performed at high speed. Such a picture may be detected by using the parameter Sad obtained by the parameter calculating section 10.

In the same manner as the picture type selecting section 3, a statistics calculating section 22 calculates the parameter nMad related to intra-coding and the parameter nSad related to inter-coding by processing the parameters Mad, Sad, and further calculates the parameter Mp indicating the intensity of motion, on the basis of the detection result of the transition determining section 21. It should be noted, however, that the statistics calculating section 22 interrupts an averaging process in the current picture on the basis of not only a scene change picture but also a picture in which an image changes at high speed, so a sample-and-hold operation is performed on the parameters nMad, nSad, Mp in the n−1 pictures immediately preceding the scene change picture or the picture in which an image changes at high speed. Further, when the scene change picture or the picture in which an image changes at high speed is the current picture, the parameters Mad, Sad detected in this picture are simply divided by the number of macroblocks without any averaging, and respectively assigned to the parameters nMad, nsad in the current picture.

Figure 4:
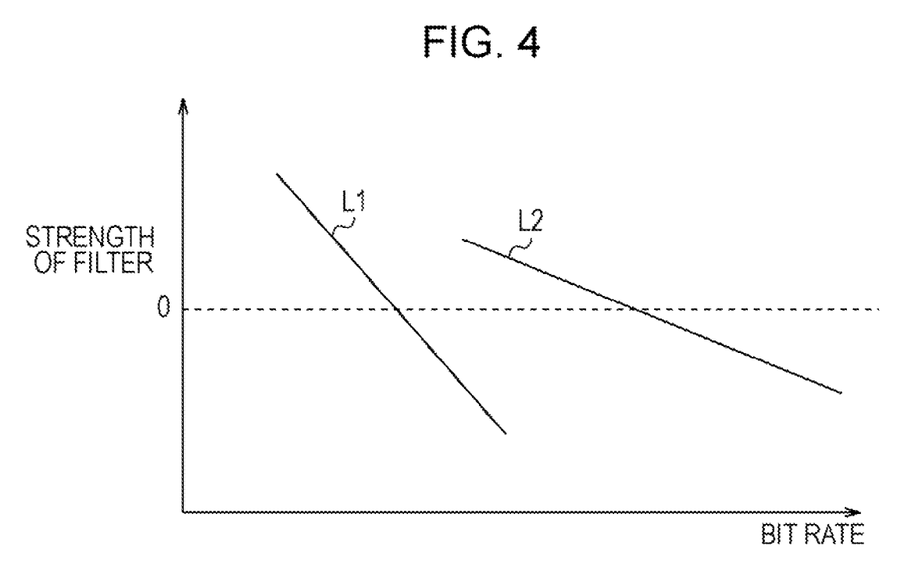
FIG. 4 is a characteristic curve diagram used for illustrating how the strength of a deblocking filter is set.

As shown in FIG. 4, the parameter processing section 7 uses the above parameters nMad, nSad, Mp to calculate predetermined characteristic curves L1, L2 each indicating the strength of a deblocking filter with the bit rate as a variable, and calculates the strength data α, β of the deblocking filter by using the characteristic curves L1, L2. FIG. 4 shows characteristic curves each indicating the strength of a deblocking filter that can provide a satisfactory image quality, when a coding process is applied to various kinds of video data with the bit rate being set as variable. The image quality was checked by visual observation. The strength of a deblocking filter is represented by an offset value due to the parameters α and β from the default setting, with 0 taken as the default setting. Further, FIG. 4 shows characteristics with respect to two kinds of video data corresponding to the characteristic curves L1 and L2.

Block noise of video data becomes more conspicuous as the bit rate decreases. Therefore, it is necessary to increase the strength of a deblocking filter as the bit rate decreases. As indicated by each of the characteristic curves L1, L2, this relationship between the bit rate and the strength of a deblocking filter can be substantially approximated by a linear function. Upon checking the correlation between this linear function L1, L2 and various parameters characterizing video data, a certain correlation was confirmed between the parameters nMad, nSad, Mp. Accordingly, in this embodiment, the characteristic curves L1, L2 each represented by a linear function is calculated by using the parameters nMad, nSad, Mp, and the parameters α, β each indicating the strength of a deblocking filter is calculated by using the characteristic curves L1, L2.

Multiplication circuits 23, 24 weights the parameters nMad, nsad, Mp by a weighting factor WG according to the strength of a grain mode, and a weighting factor WMbNum according to the number of macroblocks per one picture.

Grain is noise due to a film flaw occurring in a moving image in a film, and gives an old feel to a movie. The grain mode refers to a mode for applying a coding process on video data in such a way that this noise is not lost, that is, the grain is preserved for an old movie so that the movie retains an old feel. In the case of video data such as an old movie, if the strength of a deblocking filter is too high, not only block noise but also grain is removed, so the old feel is lost.

Figure 5:
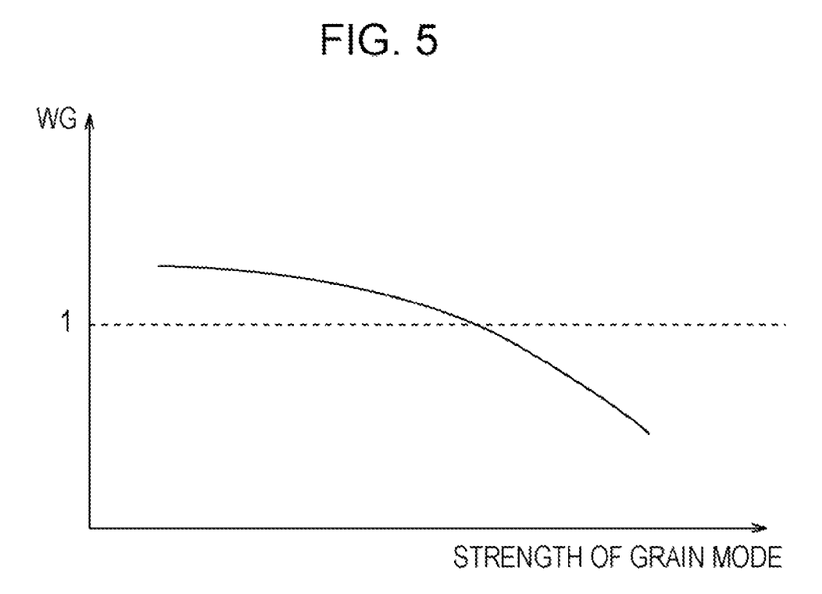
FIG. 5 is a characteristic curve diagram used for illustrating how correction is made according to the strength of a grain mode.

Accordingly, in this embodiment, an input of On/Off of the grain mode or the strength of the grain mode indicating a degree of grain preservation is accepted from an operator at the time of editing, and as shown in FIG. 5, the weighting factor WG according to the strength of the grain mode is generated so that, within a range of a fixed upper limit, its value decreases as the degree of grain preservation increases. Here, the direction in which the value of the weighting factor WG decreases is the direction in which the strength of the deblocking filter decreases.

Figure 6:
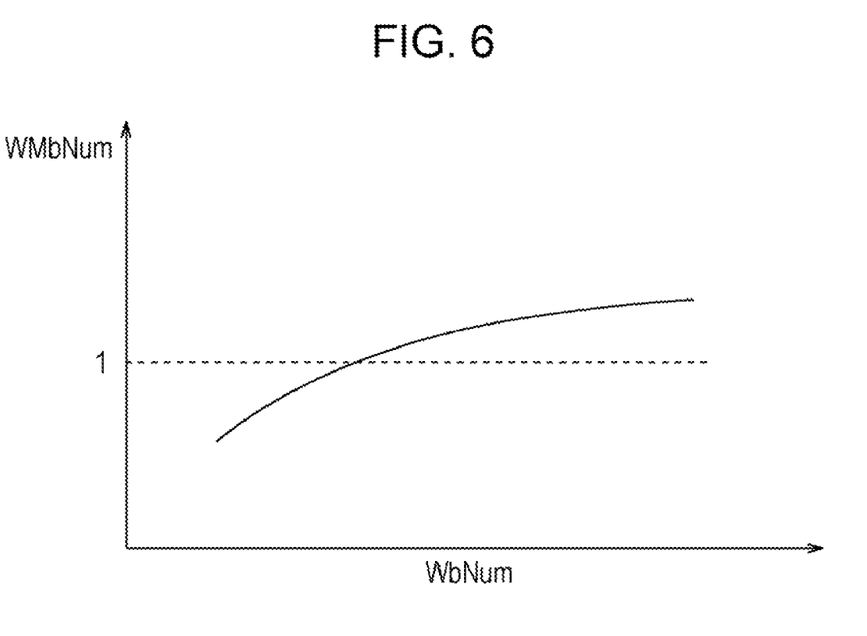
FIG. 6 is a characteristic curve diagram used for illustrating how correction is made according to the number of macroblocks in one picture.

On the other hand, when applying a coding process at a fixed bit rate, block noise becomes more conspicuous as the number of macroblocks constituting one picture increases. Accordingly, in this embodiment, as shown in FIG. 6, the weighting factor WMbNum according to the number of macroblocks is generated so that its value increases as the number of macroblocks constituting one picture increases.

The characteristic curve calculating section 25 calculates the slope and intercept defining the linear function L1, L2 described above with reference to FIG. 4 by executing a computation process according to the equation below by using the parameters nMad, nsad, Mp that have been subjected to the weighting process in the multiplication circuit 24.

[Equation 4]

$$\text{slope} = c1/\text{pow}(n\text{Mad}^{1/2} \times n\text{Sad}, c2) + C3 \times \log(Mp) + C4 \quad (4)$$

[Equation 5]

$$\text{intercept} = D1 + D2 \times \text{pow}(\text{abs}(\text{slope}), D3) + D4 \times \log(Mp) + D5 \times n\text{Mad}^{1/2} \quad (5)$$

Here, pow(A, B) is a function indicating the B-th power of A, abs(A) is a function for taking the absolute value of A, and the base of log is e. C1 to C4, D1 to D5 each represent a factor obtained by statistically processing the parameters nMad, nsad, Mp of the various kinds of video data described above with reference to FIG. 4.

The multiplication circuit 26 receives input of a bit rate org Bit rate as the target data amount of coded data per unit time from the rate control section 5, and weights the bit rate org Bit rate by the weighting factor WMb based on the number of macroblocks per unit time, thereby correcting the bit rate org Bit rate by the number of macroblocks per unit time and outputting the resulting value.

[Equation 6]

$$\text{Bit rate} = E \times \text{org Bit rate} \times Mb\text{rate} \quad (6)$$

Figure 7:
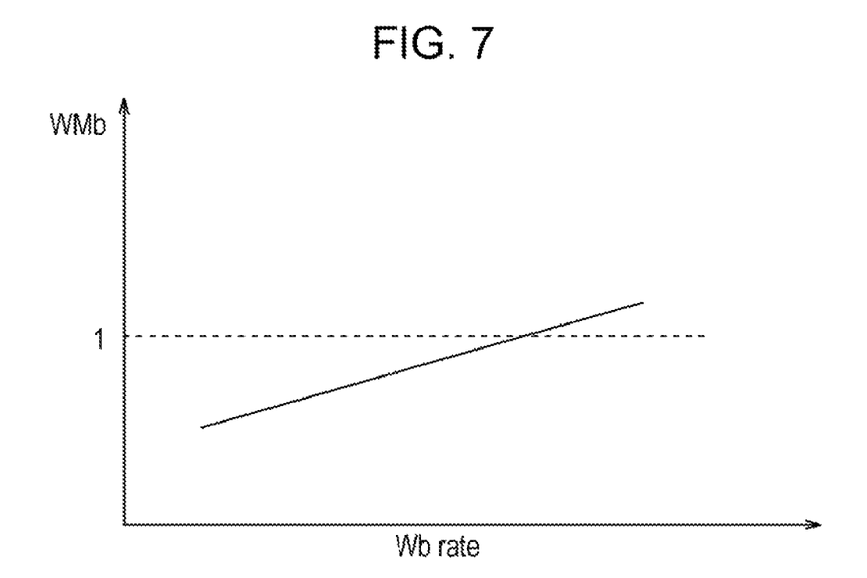
FIG. 7 is a characteristic curve diagram used for illustrating how correction is made according to the number of macroblocks per unit time.

Here, E denotes a factor. That is, even when applying a coding process at the same bit rate, if the number of macroblocks per unit time is large, the amount of data that can be assigned to one macroblock decreases, so block noise is liable to occur. Accordingly, in this embodiment, as shown in FIG. 7, the weighting factor WMb based on the number of macroblocks whose value increases as the number of macroblocks Mb rate per unit time increases is generated, and the bit rate org Bit rate is corrected by this weighting factor WMb.

A correction value calculating section 27 executes a computation according to the equation below on the basis of the slope and intercept calculated in the characteristic curve calculating section 25, thereby calculating a strength value y indicating the strength of a deblocking filter as an offset value from the default setting. In this process, in accordance with the picture type notified from the picture type selecting section 3, the correction value calculating section 27 calculates the strength value y only with the P-picture in the case of frame coding. In the case of field coding, the correction value calculating section 27 calculates the strength value y only with P-top. The encoder 1 thus updates the strength of a deblocking filter only with the P-picture or P-top.

[Equation 7]

$$y = \text{slope} \times \text{Bit rate} + \text{intercept} \quad (7)$$

A filter 28 is an IIR filter including summing circuits 29, 30 and delay circuits (D) 31, 32. The filter 28 performs cyclic summation of the strength value y calculated in the correction value calculating section 27 before averaging, and outputs the processing results as the strength data α and β of the deblocking filter. Here, as α and β, processing results of the same value obtained by the processing in the IIR filter are applied.

When a scene change is detected by the transition determining section 21, the filter 28 resets the cyclic summation value. An FIR filter or the like may be applied instead of the IIR filter.

(2) Operation of Embodiment

In the configuration described above, for the sequentially inputted video data DV (FIG. 1), the parameter Mad indicating the complexity of an intra-coding process, and the parameter Sad indicating the complexity of an inter-coding process are obtained in the parameter calculating section 10, and the parameters Mad, Sad are processed in the picture type selecting section 3 to thereby dynamically set the GOP structure of the video data DV. In accordance with this setting, a linear transform process is applied to the video data DV by intra-prediction and inter-prediction under rate control by the rate control section 5 in the coding section 2, and the resulting factor data is subjected to a quantization process. Further, this factor data is subjected to an entropy coding process by the entropy coding section 6, generating the coded data DF. The factor data is also decoded by the decoder 8 and stored into the reference memory 4 as image data of the reference frame.

In the encoder 1, through the series of processes described above, a dynamic GOP structure is set in accordance with the video data DV on the basis of the parameter Mad indicating the complexity of an intra-coding process, and the parameter Sad indicating the complexity of an inter-coding process, thereby making it possible to set a GOP structure appropriately in accordance with the video data DV when applying a coding process to the video data DV. It is thus possible to efficiently apply a coding process to the video data DV.

Further, in the encoder 1, the parameters Mad, Sad related to the dynamic setting of the GOP structure are inputted to the parameter processing section 7 (FIG. 1) where, on the basis of each of the parameters Mad, Sad, a characteristic curve indicating the strength of a deblocking filter is obtained with the bit rate Bit rate, which represents the data amount of the coded data DF per unit time, as a variable (FIG. 4). The strength data of the deblocking filter is generated by using this characteristic curve.

That is, a coding process was applied to various kinds of video data while varying the bit rate, followed by visual observation of the resulting data. It was found as a result that the optimal value of the strength of a deblocking filter can be represented by a characteristic curve that takes the bit rate of the coded data DF as a variable (FIG. 4), and that this characteristic curve has a strong correlation with the intra-coding complexity and the inter-coding complexity. Accordingly, in this embodiment, on the basis of the parameter Mad, Sad, a characteristic curve indicating the strength of the deblocking filter is obtained with the bit rate Bit rate of the coded data DF as a variable (FIG. 4), and the strength of the deblocking filter is set by using this characteristic curve. Therefore, in this embodiment, the strength of the deblocking filter can be set automatically and appropriately, which significantly reduces the load on the operator in comparison to the related art, and also enables a coding process of the video data DV at high image quality.

Further, in the encoder 1, the parameter Mad is detected by calculating the variance of pixel values in each macroblock of video data, irrespective of the intra-prediction in the coding section 2. The complexity of intra-coding can be thus detected by means of a simple process, thus achieving simplification of the whole process.

Further, irrespective of the inter-prediction in the coding section 2, the parameter Sad is detected by taking the absolute values of differences of corresponding pixel values between consecutive pictures and summing the absolute values. The complexity of inter-coding can be thus detected by means of a simple process, thus achieving simplification of the whole process.

Since these parameters Mad, Sad are the parameters used for setting the picture type, parameters characterizing the video data DV can be detected by effectively utilizing the configuration related to the setting of the picture type, which also enables simplification of the whole process.

Specifically, for the video data DV, a scene change picture, or a picture with an abrupt change in image quality due to fade-in or the like is detected. For the video data DV, after the parameter Mad, Sad is divided by one number of macroblocks, followed by averaging over a predetermined number n of pictures from the current picture in such a way as to exclude pictures subsequent to the scene change picture or the picture with an abrupt change in image quality. The parameter Mp indicating the intensity of motion is calculated by dividing the parameter nsad by the averaged parameter nMad.

For the video data DV, on the basis of the parameters nMad, nSad, Mp, the slope and intercept of a linear function is calculated by the characteristic curve calculating section 25, and a characteristic curve that takes the bit rate of the coded data DF as a variable is obtained. In the correction value calculating section 27, the bit rate of the coded data DF is substituted into the characteristic curve represented by the linear function defined by the slope and intercept, thereby calculating the strength value y indicating the strength of the deblocking filter. Therefore, in this embodiment, the strength of the deblocking filter can be set appropriately and automatically.

As described above, when setting the strength of the deblocking filter on the basis of the parameters nMad, nSad, Mp, in the multiplying circuits 23, 24 of the encoder 1, the parameters nMad, nSad, Mp are subjected to a weighting process so that the strength of the deblocking filter increases as the number of macroblocks in one picture of video data increases. Therefore, the present invention can be applied to the processing of the video data DV with various screen sizes, such as the video data DV in HDTV (High Definition Television) format or the video data DV in SDTV (Standard Definition Television) format, to set the strength of the deblocking filter appropriately.

Further, in the multiplying circuits 23, 24 of the encoder 1, the parameters nMad, nSad, Mp are subjected to a weighting process so that the strength of the deblocking filter decreases as the strength of the grain mode increases. Therefore, the strength of the deblocking filter can be set appropriately while effectively avoiding degradation of grain that provides an old feel.

In the multiplying circuit 26, the value of a bit rate is subjected to a weighting process so that the strength of the deblocking filter increases as the number of macroblocks per unit time increases. Therefore, the strength of the deblocking filter can be set appropriately even when processing the video data DV with varying frame or field frequencies.

In the encoder 1, the strength value y of the deblocking filter is obtained by the correction value calculating section 27 on the basis of an offset value from the default setting, and this calculated value y is averaged by the filter 28 and outputted, thereby effectively avoiding image quality degradation due to variations in the strength of the deblocking filter. Further, the filter 28 is reset upon a scene change or the like, thereby making it possible to appropriately switch the strength of the deblocking filter in response to a change in image quality.

(3) Effect of Embodiment

According to the above-described configuration, a characteristic curve indicating the strength of a deblocking filter is calculated from the complexity of intra-coding and the complexity of inter-coding with the data amount of coded data per unit time taken as a variable, and the strength of the deblocking filter is calculated from this characteristic curve, thereby making it possible to set the strength of the deblocking filter automatically and appropriately.

Further, the complexity of intra-coding is detected by detecting the variance of pixel values in each macroblock of video data, thereby making it possible to simplify the overall configuration.

Further, the inter-coding complexity is detected by taking the absolute values of differences of corresponding pixel values between consecutive pictures and summing the absolute values, thereby making it possible to simplify the overall configuration.

Further, a characteristic curve is calculated by calculating the slope and intercept of a linear function from the intra-coding complexity and the inter-coding complexity, thereby making it possible to set the strength of the deblocking filter automatically and appropriately.

Further, also by applying weighting to the intra-coding complexity and the inter-coding complexity together with the parameter Mp so that the strength of the deblocking filter increases as the number of macroblocks in one picture of video data increases, the present invention can be applied to the processing of video data in various formats to set the strength of the deblocking filter appropriately.

Further, also by applying weighting to the value of a bit rate so that the strength of the deblocking filter increases as the number of macroblocks per unit time of vide data increases, the present invention can be applied to the processing of video data in various formats to set the strength of the deblocking filter appropriately.

Further, by applying weighting to the intra-coding complexity and the inter-coding complexity together with the parameter Mp so that the strength of the deblocking filter decreases as the strength of the grain mode increases, the strength of the deblocking filter can be appropriately set in such a way as to prevent loss of grain.

Embodiment 2

In Embodiment 2, the weighting factor WG according to the grain mode described above in Embodiment 1 is automatically generated from the video data DV, thereby reducing the load on the operator. This embodiment is of the same configuration as Embodiment 1 except for the configuration related to the process of generating this weighting factor WG.

In this embodiment, a weighting factor based on the strength of grain is generated in accordance with the strength of grain. It should be noted here that F1 to F3 denote factors, and STH denotes a parameter indicating the strength of grain which is obtained by the following process. That is, with respect to macroblocks with a variance equal to or less than a predetermined value, the number of pixels whose luminance level differences from corresponding pixels in a reference picture are equal to or larger than a fixed value is detected, and the parameter STH is obtained from a macroblock in which the number of pixels whose luminance level differences are equal to or larger than a fixed value is equal to or larger than a fixed value. More specifically, with respect to the macroblock in which the number of pixels whose luminance level differences are equal to or larger than a fixed value is equal to or larger than a fixed value, the sum of the absolute values of luminance level differences from the reference picture is obtained, and the minimum value of the sum of the absolute difference values in one picture is applied as the parameter STH. In this embodiment, the strength of grain is automatically detected by this computing process according to Equation (8) below, and a first weighting factor Wgs is generated so that its value becomes smaller as the strength of grain increases.

[Equation 8]

$$Wgs = F1/\text{pow}(STH \times Sad^{1/2}, F2) + F3 \qquad (8)$$

If grain is present at this time, this means that the parameter Mad, Sad is obtained on the basis of a large value. Accordingly, in this embodiment, a second weighting factor Wmp is generated by the equation below so that its value becomes larger as the intensity of motion increases. Here, G1 to G3 denote factors.

[Equation 9]

$$Wmp = G1 \times \text{pow}(Mp, 3) + G2 \times \text{pow}(Mp, 2) + G3 \times Mp + G4 \qquad (9)$$

Since the calculation of the parameter α, β according to the grain is also affected by the image size, in this embodiment, a third weighting factor Wmb is generated by the equation below so that its value becomes larger as the number of macroblocks increases. Here, H1, H2 denote factors.

[Equation 10]

$$Wmb = H1 \times \text{Ln}(Mb\ \text{rate}) + H2 \qquad (10)$$

In this embodiment, the weighting factor WG according to the grain mode is generated by multiplication by the first to third weighting factors described above.

According to this embodiment, the weighting factor WG according to the grain mode is generated automatically from the video data DV, thereby making it possible to reduce the load on the operator and suppress block noise even more appropriately.

Embodiment 3

In the above-mentioned embodiments description is directed to a case where weighting is applied to the intra-coding complexity and the inter-coding complexity together with the parameter Mp. However, the present invention is not limited to this. A weighting process may be applied to only the intra-coding complexity and the inter-coding complexity by calculating the parameter Mp after applying weighting before the statistics calculating section 22.

In the above-mentioned embodiments, description is directed to a case where weighting is applied to the intra-coding complexity and the inter-coding complexity so that the strength of the deblocking filter increases as the number of macroblocks in one picture increases, and that the strength of the deblocking filter decreases as the strength of the grain mode increases. However, the present invention is not limited to this. A weighting process may be applied to the value of a bit rate instead of the intra-coding complexity and the inter-coding complexity, or a weighting process may be applied to the calculation result of the correction value calculating section 27 or the output value of the filter 28.

In the above-mentioned embodiments, description is directed to a case where weighting is applied to the value of a bit rate so that the strength of the deblocking filter increases as the number of macroblocks per unit time increases. However, the present invention is not limited to this. A weighting process may be applied to the intra-coding complexity and the inter-coding complexity instead of the value of a bit rate, or a weighting process may be directly applied to the calculation result of the correction value calculating section 27 or the output value of the filter 28.

In the above-mentioned embodiments, description is directed to a case where the parameters Mad, Sad are calculated on the basis of the current picture and the succeeding pictures. However, the present invention is not limited to this. The parameters Mad, Sad may be calculated on the basis of a predetermined number of pictures preceding and succeeding the current picture. Further, the parameters Mad, Sad may be calculated on the basis of the current picture and the preceding pictures.

In the above-mentioned embodiments, description is directed to a case where the intra-coding complexity and the inter-coding complexity are obtained by a simple process using the variance of pixel values or the like. However, the present invention is not limited to this. Various kinds of parameter indicating the complexity of intra-coding and the complexity of inter-coding can be applied, such as in a case where the intra-coding complexity and the inter-coding complexity are obtained by calculating intra-prediction residual and inter-prediction residual.

In the above-mentioned embodiments, description is directed to a case where a characteristic curve that takes the bit rate of coded data as a variable is obtained. However, the present invention is not limited to this. For example, various kinds of data amount per unit time, such as the data amount per one macroblock, may be applied.

In the above-mentioned embodiments, description is directed to a case where the present invention is applied to an encoder conforming to H. 264. However, the present invention is not limited to this. The present invention is applicable to a wide range of encoders that applies a coding process to video data on a block-by-block basis while switching between an intra-coding process and an inter-coding process to generate coded data.

The present invention is applicable to, for example, a coding apparatus conforming to the ITU-T Recommendation H. 264.

It should be understood by those skilled in the art that various modifications, combinations, sub-combinations and alterations may occur depending on design requirements and other factors insofar as they are within the scope of the appended claims or the equivalents thereof.

What is claimed is:

1. A coding apparatus for applying a coding process to video data on a block-by-block basis while switching between an intra-coding process and an inter-coding process to generate coded data, and outputting the coded data together with strength data indicating a strength of a deblocking filter, comprising:

an intra-coding complexity detecting section that detects an intra-coding complexity indicating a complexity of the intra-coding process;

an inter-coding complexity detecting section that detects an inter-coding complexity indicating a complexity of the inter-coding process;

a characteristic curve calculating section that calculates a characteristic curve indicating a value of the strength data with a data amount per unit time of the coded data as a variable, on the basis of the intra-coding complexity and the inter-coding complexity; and a strength value calculating section that calculates a value of the strength data by substituting a data amount of the coded data into the characteristic curve.

2. The coding apparatus according to claim 1, wherein:

the intra-coding complexity detecting section detects the intra-coding complexity by taking absolute values of differences of individual pixels from a mean of pixel values in each macroblock of the video data and summing the absolute values.

3. The coding apparatus according to claim 1, wherein:

the inter-coding complexity detecting section detects the inter-coding complexity by taking absolute values of differences of corresponding pixel values between consecutive pictures and summing the absolute values.

4. The coding apparatus according to claim 1, wherein:

the characteristic curve is a linear function with a bit rate of the coded data taken as a variable; and the characteristic curve calculating section calculates the characteristic curve by calculating a slope and intercept of the linear function from the intra-coding complexity and the inter-coding complexity.

5. The coding apparatus according to claim 1, further comprising a weighting processing section that applies weighting to the intra-coding complexity and the inter-coding complexity, the data amount per unit time, or the value of the strength data to correct the value of the strength data so that the strength of the deblocking filter increases as the number of macroblocks in one picture of the video data increases.

6. The coding apparatus according to claim 1, further comprising a weighting processing section that applies weighting to the intra-coding complexity and the inter-coding complexity, the data amount per unit time, or the value of the strength data to correct the value of the strength data so that the strength of the deblocking filter increases as the number of macroblocks per unit time of the video data increases.

7. The coding apparatus according to claim 1, further comprising a weighting processing section that applies weighting to the intra-coding complexity and the inter-coding complexity, the data amount per unit time, or the value of the strength data to correct the value of the strength data so that the strength of the deblocking filter decreases as a strength of a grain mode increases.

8. A coding method for applying a coding process to video data on a block-by-block basis while switching between an intra-coding process and an inter-coding process to generate coded data, and outputting the coded data together with strength data indicating a strength of a deblocking filter, comprising the steps of:

detecting an intra-coding complexity indicating a complexity of the intra-coding process;

detecting an inter-coding complexity indicating a complexity of the inter-coding process;

calculating a characteristic curve indicating a value of the strength data with a data amount per unit time of the coded data as a variable, on the basis of the intra-coding complexity and the inter-coding complexity; and calculating a value of the strength data by substituting a data amount of the coded data into the characteristic curve.

9. A non-transitory computer-readable medium embedded with a computer program for applying a coding process to video data on a block-by-block basis while switching between an intra-coding process and an inter-coding process to generate coded data, and outputting the coded data together with strength data indicating a strength of a deblocking filter, comprising the steps of:

detecting an intra-coding complexity indicating a complexity of the intra-coding process;

detecting an inter-coding complexity indicating a complexity of the inter-coding process;

calculating a characteristic curve indicating a value of the strength data with a data amount per unit time of the coded data as a variable, on the basis of the intra-coding complexity and the inter-coding complexity; and calculating a value of the strength data by substituting a data amount of the coded data into the characteristic curve.

* * * * *